(No Model.)
E. P. USHER.
BATTERY PLATE.
No. 480,887. Patented Aug. 16, 1892.
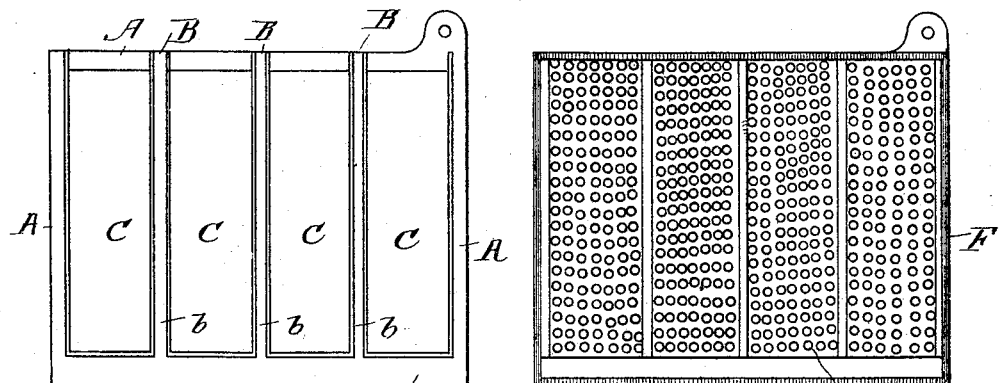
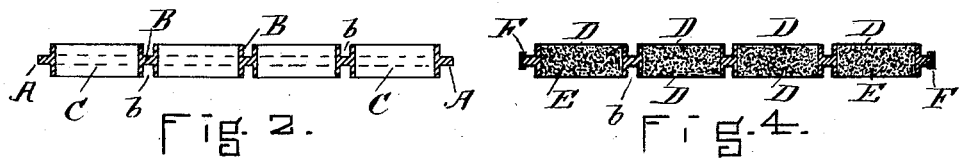
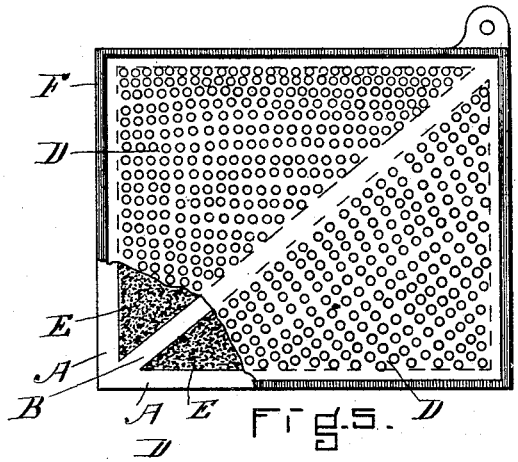
WITNESSES.
Frank G. Parker
Matthew M. Blunt
INVENTOR.
Edward P. Usher
by A. S. Greene
atty

UNITED STATES PATENT OFFICE.

EDWARD P. USHER, OF GRAFTON, MASSACHUSETTS, ASSIGNOR TO THE HOPEDALE ELECTRIC COMPANY, OF WEST VIRGINIA.

BATTERY-PLATE.

SPECIFICATION forming part of Letters Patent No. 480,887, dated August 16, 1892.

Application filed February 19, 1892. Serial No. 422,095. (No model.)

*To all whom it may concern:*

Be it known that I, EDWARD P. USHER, of Grafton, in the county of Worcester and State of Massachusetts, have invented certain new and useful Improvements in Battery-Plates, of which the following, taken in connection with the accompanying drawings, is a specification.

My invention relates to the plates of secondary or storage batteries; and it consists in the improved plates herein set forth and in the described method of making such plates.

Briefly stated, my invention is embodied in a battery-plate having a marginal frame with open interior spaces and one or more cross-bars spanning it, broad lateral surfaces of finely-perforated lead-foil adhering to and supported by said frame and cross-bars, and a filling of dry powdered oxide of lead packed into the inclosed spaces. These cross-bars are preferably vertical, connecting the top and bottom of the frame at intervals, and deeply grooved or formed with edge flanges, such grooves or the spaces between the edge flanges of the upright bars forming wells for the acid to rise in and through which it may be agitated when desired. Instead of the vertical bars one or more oblique cross-bars may subdivide the space inclosed by the marginal frame. The edges of the plates are sealed with a quick-hardening acid-proof gum.

My novel method of making these peculiar plates involves the preparation of the marginal frame with its cross-bars and open spaces each side thereof, coating one face of the frame and bars with adhesive matter and applying thereto a broad sheet of lead-foil, then filling the open spaces with dry oxide of lead and covering the same and the frame-surface with a sheet of lead-foil adhering to the frame and bars, and then sealing the edges of said sheet and finely perforating it to admit the acid to the inclosed active material.

In the drawings, Figure 1 is an elevation of the skeleton frame in the best form for a positive plate, and Fig. 2 a transverse section thereof. Figs. 3 and 4 are like views of the completed positive plate. Figs. 5 and 6 are similar views of a modified form adapted for a negative plate.

In carrying out my invention in its best form I first prepare a metallic skeleton lead plate, as shown in Figs. 1 and 2, having a marginal frame A and flanged and grooved vertical bars B B, with open space C C between them. The grooves $b$ between the edge flanges of the bars B B constitute open vertical wells, in which the acid may rise and circulate. This form of plate I use, preferably, as a positive. Taking this skeleton plate, I cover one of its surfaces with glue and press thereto a sheet D, of lead-foil, molded or formed of such size and surface configuration as to cover the entire plate and to bridge over the open spaces C C and fit down into the grooves $b$, the foil being held to the metallic frame and bars securely by the glue. I then turn the plate over and fill all the spaces C C with a dry powder E, Fig. 4, consisting of some oxide of lead, and then having covered all the metallic surface of that side of the plate with glue I press upon it a similar sheet of lead-foil D, shaped and prepared to fit into and upon the skeleton plate, so as to cover the entire plate and extend over the active material E, said foil being, as before, held at all points to the frame or plate by the glue. I then dip the edges of the plate in a gum made of sulphur, rosin, pitch, beeswax, and tallow, so as to cover the surface about one-fourth of an inch, as at F. (See Figs. 1, 3, and 5.) This gum is of a liquid character and very sticky when hot, but hardens and becomes firm when cold, and, being insoluble in the acid, holds the foil in place, even if the glue is attacked, while at the same time it covers the edges with an insulating-coating. I do not limit myself to this specific compound, and I make no present claim thereto, the same forming the subject-matter of my application for patent filed June 10, 1892, Serial No. 436,211.

For a negative I may cast a plate, as shown in Figs. 5 and 6, the cross-bar placed obliquely and not necessarily grooved. One entire surface of the plate and cross-bar I then coat with the glue and press, as before, a sheet of lead-foil of the proper size, so as to cover the entire area of the plate. I then turn this over and fill the spaces C C with a dry powder consisting of some oxide of lead, and then coating the metallic lead surface of frame and bar with glue I press thereon another sheet of lead-foil of the proper size, so as to cover the entire area of the plate and inclose the active material E. I then dip the edges into the gum, as in the case of the positive plate. I then prick full of small holes the surface of the foil which covers the lead oxide both in the positive and negative plates and seal these holes with a mucilage wash, which is readily dissolved when the plates are immersed in the acid, thus exposing the active material inclosed to the usual action of the electrolyte. Taking these plates, I arrange them into a cell and interpose wooden separators between them in accordance with my practice, as set forth in my application for patent on storage-batteries, Serial No. 422,094, and filed simultaneously herewith. I have found this to be an effective cell and to be inexpensive and easy to manufacture.

The use of lead-foil as a wrapper in distinction from even the thinnest of metallic sheet-lead is a marked advantage of my invention. Its lightness, cheapness, facility of applying by glue to the frame, and its ready perforation without power are of great importance, and the added fact that the foil itself becomes disintegrated and a part of the active material of the positive plate when formed emphasizes its value. An ordinary sheet-lead wrapper, even when perforated, would be a barrier, interfering greatly with the efficiency of the plate, and the method of construction could not be successfully followed at any of its various stages. Each leaf or fold of this foil has a thickness of about four one-thousandths of an inch, which is far thinner than it is possible to make metallic sheet-lead. In its texture and weight it bears more resemblance to tissue-paper, and the glue readily holds it to the frame, while the edges are secured by the acid-proof gum.

I claim as my invention—

1. The battery-plate described, consisting of the marginal frame with open interior spaces and one or more cross-bars, the perforated lead-foil wrapper as distinguished from ordinary sheet-lead adhering to said frame and bars, and the filling of active material within said spaces and inclosed by said perforated foil, the edges of said plate being sealed by an acid-proof gum, substantially as set forth.

2. The method of making battery-plates, which consists in casting a marginal frame with one or more cross-bars joined thereto and with open spaces between said bars and frame, coating one side of said frame and bars with an adhesive substance and applying a leaf of lead-foil thereto, then filling the open spaces of the frame with a powdered oxide of lead, then applying over the same another leaf of lead-foil similarly caused to adhere to the frame and bars, and then sealing the edges of the plate with an acid-proof gum and perforating such foil, substantially as set forth.

In testimony whereof I have signed my name to this specification, on this 17th day of February, A. D. 1892, in the presence of two subscribing witnesses.

EDWARD P. USHER.

Witnesses:
A. H. SPENCER,
GEORGE S. LITTLEFIELD.